US012626095B2

(12) United States Patent
     Pevny

(10) Patent No.: US 12,626,095 B2
(45) Date of Patent: May 12, 2026

(54) MACHINE LEARNING OUTPUTS WITH HIGH CONFIDENCE EXPLANATIONS

(71) Applicant: Avast Software s.r.o., Prague (CZ)

(72) Inventor: Tomas Pevny, Prague (CZ)

(73) Assignee: Gen Digital Inc., Tempe, AZ (US)

( * ) Notice: Subject to any disclaimer, the term of this patent is extended or adjusted under 35 U.S.C. 154(b) by 1208 days.

(21) Appl. No.: 17/492,294

(22) Filed: Oct. 1, 2021

(65) Prior Publication Data

US 2023/0104673 A1     Apr. 6, 2023

(51) Int. Cl.
     *G06N 3/045*          (2023.01)

(52) U.S. Cl.
     CPC .................................... *G06N 3/045* (2023.01)

(58) Field of Classification Search
     CPC ......... G06N 3/045; G06N 3/0442; G06N 3/09
     See application file for complete search history.

(56) References Cited

U.S. PATENT DOCUMENTS

| | | | | |
|---|---|---|---|---|
| 2018/0365560 A1* | 12/2018 | Qiao | ................... | G06F 21/6245 |
| 2019/0354805 A1* | 11/2019 | Hind | ................... | G06F 18/2148 |
| 2020/0364616 A1* | 11/2020 | Wong | ..................... | G06N 20/00 |
| 2022/0114595 A1* | 4/2022 | Balayan | ................. | G06N 5/045 |
| 2023/0056772 A1* | 2/2023 | Zhu | .......................... | G06N 3/08 |

FOREIGN PATENT DOCUMENTS

WO     WO-2023277905 A1 *   1/2023   ....... G06Q 10/06316

OTHER PUBLICATIONS

Jaromir Janisch, Tomas Pevny and Viliam Lisy, "Cost-Efficient Hierarchical Knowledge Extraction with Deep Reinforcement Learning", Artificial Intelligence Center, Department of Computer Science, pp. 2-3 (Year: 2020).*

Leon Bottou, "Large-Scale Machine Learning with Stochastic Gradient Descent", 2010, NEC Labs America, pp. 1 & 7 (Year: 2010).*

Xu, D., Shi, Y., Tsang, I. W., Ong, Y. S., Gong, C., & Shen, X. (2019). Survey on multi-output learning. IEEE transactions on neural networks and learning systems, 31(7), 2409-2429. (Year: 2019).*

Sun, Jiamei, et al. "Explanation-guided training for cross-domain few-shot classification." 2020 25th international conference on pattern recognition (ICPR). IEEE, 2021 (Year: 2021).*

(Continued)

*Primary Examiner* — Shahid K Khan
(74) *Attorney, Agent, or Firm* — AVEK IP, LLC; Mark C. Young

(57)          ABSTRACT

A malware classification system provides improved confidence in explanations of neural network classification outputs using methods such as weighting or masking when training the neural network to train the network on a sample resembling or including the explanation. The explanation in some examples comprises a subset of a hierarchical input vector that is responsible for the neural network's classification output. In another example the neural network has an inner portion configured to reduce the weight of elements of the output not significantly contributing to the explanation of the output, such as by reducing the weight of as many such outputs to zero as is practical in generating the desired output.

20 Claims, 4 Drawing Sheets

(56) References Cited

OTHER PUBLICATIONS

Meister, Clara, et al. "Is sparse attention more interpretable?." arXiv preprint arXiv:2106.01087 (Year: 2021).*

Kohlbrenner, Maximilian, et al. "Towards best practice in explaining neural network decisions with LRP." 2020 international joint conference on neural networks (IJCNN). IEEE (Year: 2020).*

Ketepalli, Gayatri, and Premamayudu Bulla. "Review on Generative Deep Learning Models and Datasets for Intrusion Detection Systems." Revue d'Intelligence Artificielle 34.2 (Year: 2020).*

Kuppa, Aditya, and Nhien-An Le-Khac. "Adversarial XAI methods in cybersecurity." IEEE transactions on information forensics and security 16 (2021): 4924-4938 (Year: 2021).*

Warnecke, Alexander, et al. "Evaluating explanation methods for deep learning in security." 2020 IEEE european symposium on security and privacy (EuroS&P). IEEE (Year: 2020).*

Amich, Abderrahmen, and Birhanu Eshete. "Explanation-guided diagnosis of machine learning evasion attacks." International Conference on Security and Privacy in Communication Systems. Cham: Springer International Publishing (Year: 2021).*

Ijaz, Muhammad, Muhammad Hanif Durad, and Maliha Ismail. "Static and dynamic malware analysis using machine learning." 2019 16th International bhurban conference on applied sciences and technology (IBCAST). IEEE (Year: 2019).*

Li, Dongfang, et al. "Towards faithful explanations for text classification with robustness improvement and explanation guided training." arXiv preprint arXiv:2312.17591 (Year: 2023).*

Binder, Alexander, et al. "Layer-wise Relevance Propagation for Neural Networks with Local Renormalization Layers." International Conference on Artificial Neural Networks. Springer, Cham, 2016.

Riberio, Marco Tulio, et al. "Why Should I Trust You?": Explaining the Predictions of Any Classifier. Knowledge Discovery and Data Mining. KDD 2016 San Francisco, CA.

Belanger, et al. "End-to-End Learning for Structured Prediction Energy Networks" Proceedings of the 34th International Conference on Machine Learning. Sydney, Australia, PMLR 70, 2017.

Kawaguchi, et al. "Generalization in Deep Learning" arXiv preprint arXiv:170.05468, 2017.

Lundberg, Scott M and Su-In Lee. A Unified Approach to Interpreting Model Predictions. 31st Conference on Neural Information Processing Systems (NIPS 2017), Long Beach, CA.

Chang, et al. "A Game Theoretic Approach to Class-wise Selective Rationalization" 33rd Conference on Neural Information Processing Systems (NeurIPS 2019), Vancouver, Canada.

Ying, Rex, et al. "Gnn Explainer: A tool for post-hoc explanation of graph neural networks." arXiv preprint arXiv:1903.03894, 2019.

\* cited by examiner

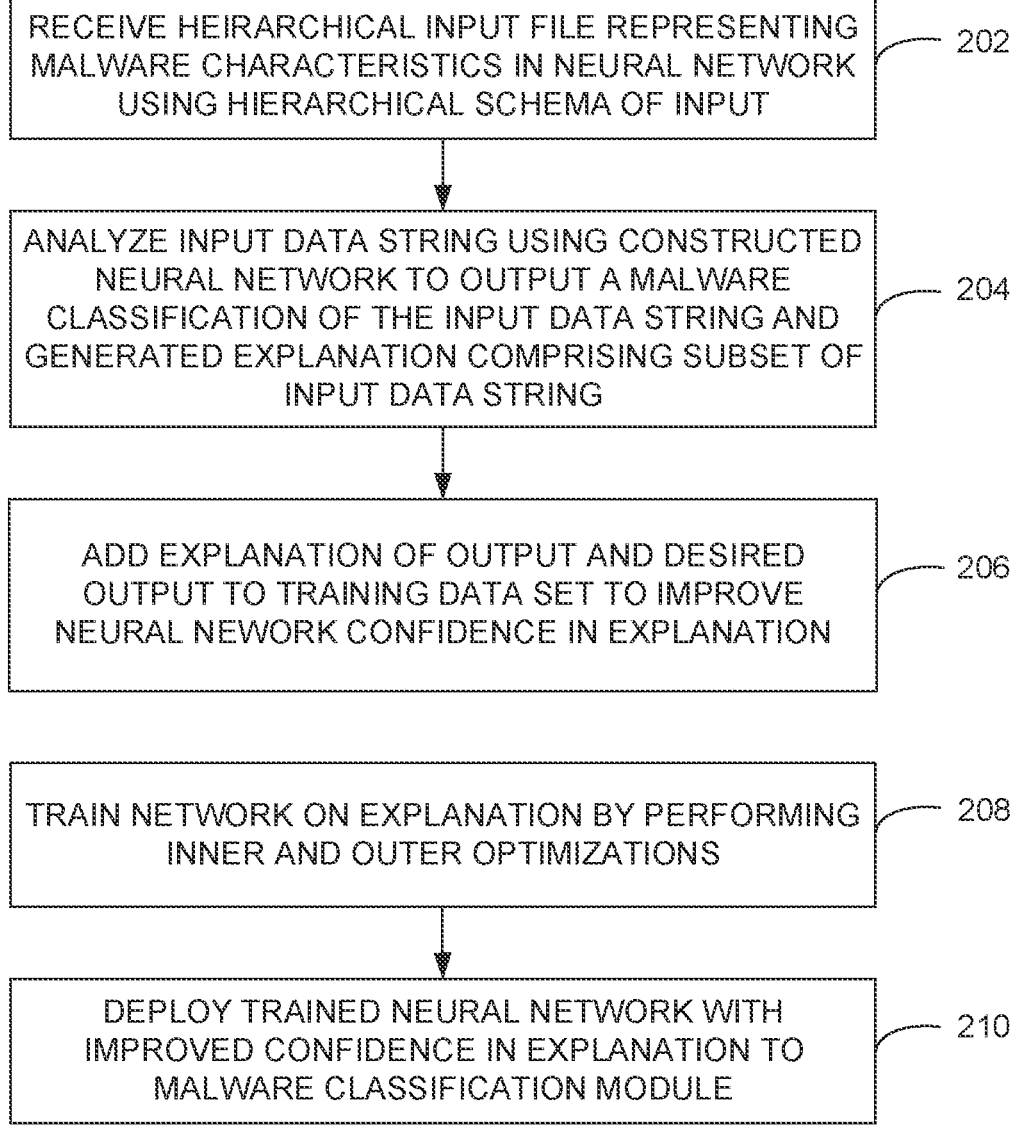

RECEIVE HEIRARCHICAL INPUT FILE REPRESENTING MALWARE CHARACTERISTICS IN NEURAL NETWORK USING HIERARCHICAL SCHEMA OF INPUT — 202

ANALYZE INPUT DATA STRING USING CONSTRUCTED NEURAL NETWORK TO OUTPUT A MALWARE CLASSIFICATION OF THE INPUT DATA STRING AND GENERATED EXPLANATION COMPRISING SUBSET OF INPUT DATA STRING — 204

ADD EXPLANATION OF OUTPUT AND DESIRED OUTPUT TO TRAINING DATA SET TO IMPROVE NEURAL NEWORK CONFIDENCE IN EXPLANATION — 206

TRAIN NETWORK ON EXPLANATION BY PERFORMING INNER AND OUTER OPTIMIZATIONS — 208

DEPLOY TRAINED NEURAL NETWORK WITH IMPROVED CONFIDENCE IN EXPLANATION TO MALWARE CLASSIFICATION MODULE — 210

FIG. 2

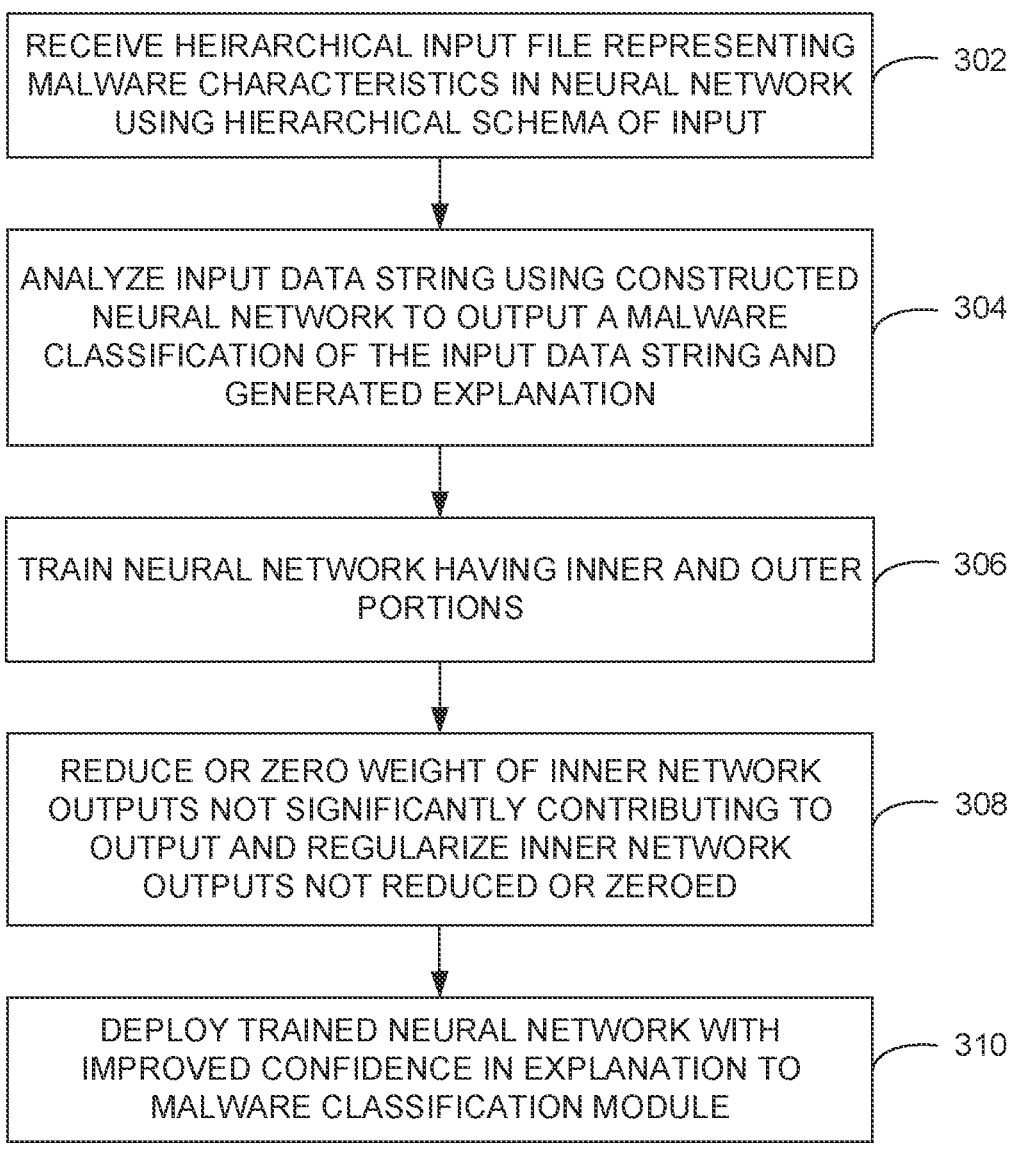

RECEIVE HEIRARCHICAL INPUT FILE REPRESENTING MALWARE CHARACTERISTICS IN NEURAL NETWORK USING HIERARCHICAL SCHEMA OF INPUT — 302

ANALYZE INPUT DATA STRING USING CONSTRUCTED NEURAL NETWORK TO OUTPUT A MALWARE CLASSIFICATION OF THE INPUT DATA STRING AND GENERATED EXPLANATION — 304

TRAIN NEURAL NETWORK HAVING INNER AND OUTER PORTIONS — 306

REDUCE OR ZERO WEIGHT OF INNER NETWORK OUTPUTS NOT SIGNIFICANTLY CONTRIBUTING TO OUTPUT AND REGULARIZE INNER NETWORK OUTPUTS NOT REDUCED OR ZEROED — 308

DEPLOY TRAINED NEURAL NETWORK WITH IMPROVED CONFIDENCE IN EXPLANATION TO MALWARE CLASSIFICATION MODULE — 310

FIG. 3

MACHINE LEARNING OUTPUTS WITH HIGH CONFIDENCE EXPLANATIONS

FIELD

The invention relates generally to security in computerized systems, and more specifically to data-driven automated malware classification with human-readable explanations.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, antivirus software installed on a personal computer or in a firewall may use characteristics of known malicious data to look for other potentially malicious data, and block it. In a personal computer, the user is typically notified of the potential threat, and given the option to delete the file or allow the file to be accessed normally. A firewall similarly inspects network traffic that passes through it, permitting passage of desirable network traffic while blocking undesired network traffic based on a set of rules. Tools such as these rely upon having an accurate and robust ability to detect potential threats, minimizing the number of false positive detections that interrupt normal computer operation while catching substantially all malware that poses a threat to computers and the data they handle. Accurately identifying and classifying new threats is therefore an important part of antimalware systems, and a subject of much research and effort.

But, determining whether a new file is malicious or benign can be difficult and time-consuming, even when human researchers are simply confirming a machine-based determination. It is therefore desirable to provide machine-based malware determinations and classifications that reduce the workload on human malware researchers.

SUMMARY

One example embodiment of the invention comprises a machine learning system such as a neural network trained on an explanation vector as input and a result such as a domain classification output, improving the neural network's confidence in the explanation. In a more detailed example, an input data string with a hierarchical structure is received and analyzed using a machine learning module to generate an output, and an explanation of the output is generated comprising a subset of the input data string that is responsible for the output. A weighting or masking function is applied when training the machine learning module using the generated explanation of the output and the output itself, and is configured to improve the output generated when the generated explanation of output is provided as input. In a further example, the loss function used to train the machine learning module is optimized using an inner optimization for the estimated output and the weighting or masking function.

In another example, an input data string with a hierarchical structure is again received and analyzed using a machine learning module to generate an output, and an explanation of the output is generated comprising a subset of the input data string that is responsible for the output. The machine learning module comprises a neural network having an inner portion and an outer portion, the inner portion configured to reduce the weight of elements of the output not significantly contributing to the explanation of the output, such as by reducing the weight of as many such outputs to zero as is practical in generating the desired output.

The details of one or more examples of the invention are set forth in the accompanying drawings and the description below. Other features and advantages will be apparent from the description and drawings, and from the claims.

BRIEF DESCRIPTION OF THE FIGURES

FIG. 2 is a flowchart of an example malware classification machine learning system using explanations of samples in the training process, consistent with an example embodiment of the present invention.

FIG. 3 is a flowchart of an example malware classification machine learning system using weighted outputs of an inner neural network layer, consistent with an example embodiment of the present invention.

DETAILED DESCRIPTION

Figure 1:
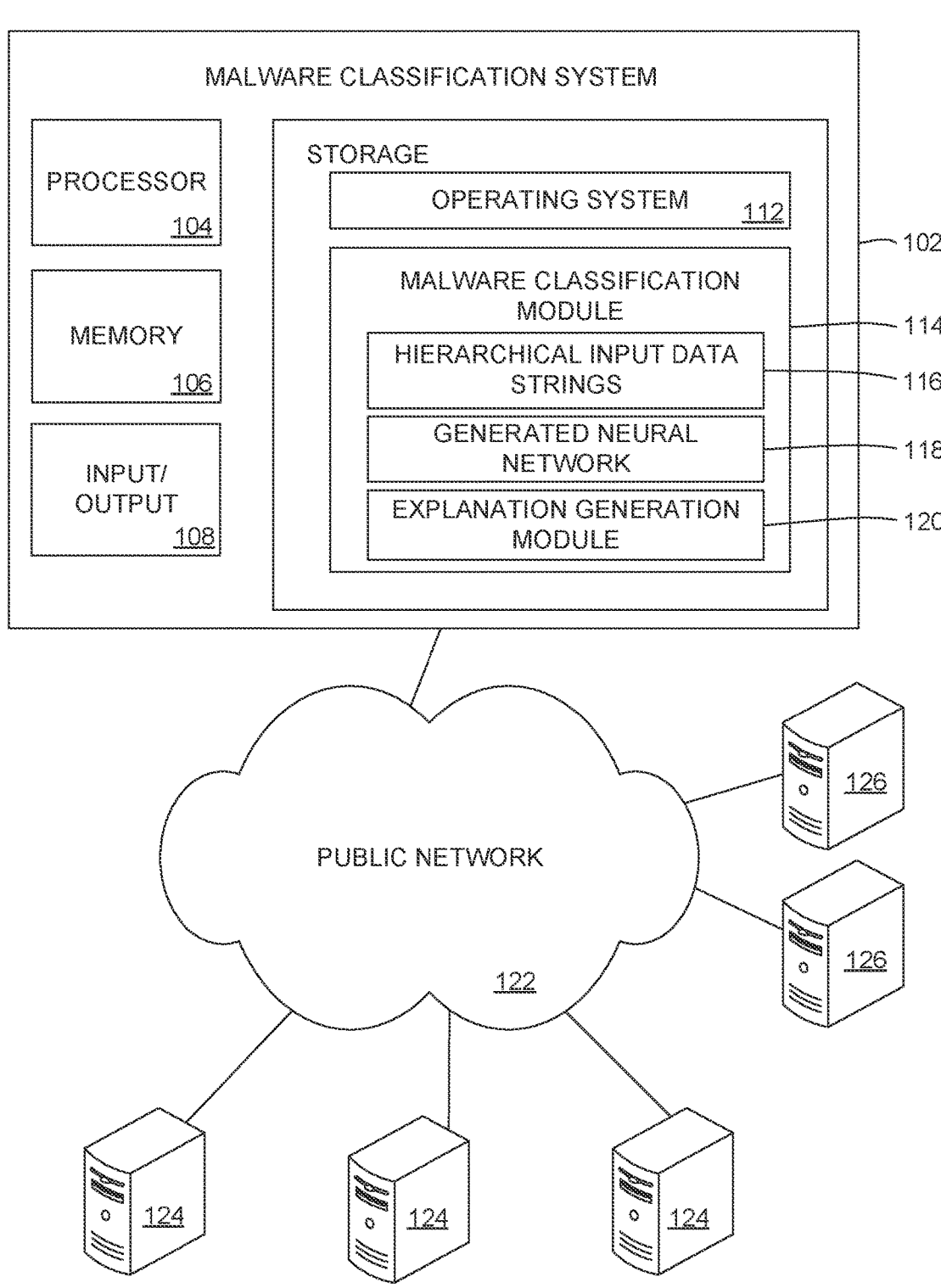
FIG. 1 shows an example malware classification system, consistent with an example embodiment of the present invention.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing information from a computer or using the computer for unintended purposes. But, with new threats constantly emerging, efficient and timely detection and classification of vulnerabilities within computerized systems and IoT devices such as a home appliance remain a significant challenge. New anti-malware algorithms, artificial intelligence networks or systems, and other such solutions are therefore constantly under development.

Machine learning tools such as neural networks are often used to analyze and classify potential new threats, with varying degrees of success. Some machine learning or artificial intelligence models such as Bayesian networks use decision trees and probabilities or statistics to make determinations. Other more sophisticated systems use neural networks designed to mimic human brain function. Some neural networks, such as recurrent or convolutional neural networks, can have what is termed a "Long Short Term Memory," (LSTM), or the ability to have some persistence of memory such that events that happened long ago continue to influence the output of the system. As these systems become increasingly complex, the ability of a human observer to understand the function of the artificial intelligence system or the factors that contributed to the system's output is diminished, as the coefficients of a neural network are difficult to understand and the coefficients of an LSTM network are even more complex.

Because it is difficult to understand the process by which many artificial intelligence or machine learning systems generate their output, there is often a lack of human confidence in the accuracy or certainty of the output (sometimes called the "Black Box Verdict" problem). In many examples, even the inputs to a neural network are vectorized and not human-readable, and the interaction between many different types of sparse inputs are not easy to intuitively understand. Further, the large amount of data available as inputs, such as sandbox or other behavioral logs, reputation databases, and a variety of format-specific or subtype-specific data, can mask the importance of various factors in reaching a conclusion regarding classification of potentially malicious data.

Some machine-learning systems such as neural networks allow for determination of what portions of an input vector or set of data contribute to the output, such that an explanation of the output can be provided by way of showing which portions of the input data or vector contribute most strongly to the output. Such explanations can often contain significant amounts of noise, due in part to not being trained on inputs and outputs that closely resemble the explanation and the output of a typical domain classification problem.

Some examples presented herein therefore train a machine learning system such as a neural network on an explanation vector as input and a result such as a domain classification output, improving the neural network's confidence in the explanation. In a more detailed example, an input data string with a hierarchical structure is received and analyzed using a machine learning module to generate an output, and an explanation of the output is generated comprising a subset of the input data string that is responsible for the output. A weighting or masking function is applied when training the machine learning module using the generated explanation of the output and the output itself, and is configured to improve the output generated when the generated explanation of output is provided as input. In a further example, the loss function used to train the machine learning module is optimized using an inner optimization for the estimated output and the weighting or masking function.

In another example, an input data string with a hierarchical structure is again received and analyzed using a machine learning module to generate an output, and an explanation of the output is generated comprising a subset of the input data string that is responsible for the output. The machine learning module comprises a neural network having an inner portion and an outer portion, the inner portion configured to reduce the weight of elements of the output not significantly contributing to the explanation of the output, such as by reducing the weight of as many such outputs to zero as is practical in generating the desired output.

When applied to malware classification, the machine learning systems receive a set of input strings in a hierarchical form, such as observed characteristics of files to be analyzed when executed in a sandbox environment or the like. The hierarchical form is in some examples a JavaScript Object Notation (JSON) string, an Extensible Markup Language (XML) string, or another suitable hierarchical data format. A schema of the received input strings is determined from the set of hierarchical input strings, and is used to construct an artificial intelligence engine such as a hierarchical multiple-instance-learning neural network. The generated neural network is trained on a set of input data strings with known malware classifications so that the trained network is operable to classify the received input data strings into one or more of a plurality of malware classes. An explanation generation module uses the schema of the generated neural network and the hierarchy of the input data strings to provide an explanation as to what caused at least one of the input strings to be classified into a certain malware class, the explanation including a subset of the input data string that is most responsible or most relevant in generating the string's classification.

FIG. 1 shows an example malware classification system, consistent with an example embodiment. Here, a network device such as malware classification system 102 comprises a processor 104, memory 106, input/output elements 108, and storage 110. Storage 110 includes an operating system 112, and a malware classification module 114 that is operable to provide a malware classification of files along with an explanation as to why a file was classified in a certain way. The malware classification module 114 includes in this example a set of hierarchical input data strings 116, such as may be used to construct and train the generated neural network 118 or as may be provided as input for classification as to the presence and/or type of malware present in the string. The hierarchical input data strings 116 in a further example comprise data encoded in human-readable form, such as a JavaScript Object Notation (JSON) string, an Extensible Markup Language (XML) string, or another suitable hierarchical data format, which use human-readable words and a structural relationship or organization of data.

The generated neural network 118 in some examples is constructed at least in part based on the hierarchical structure found in one or more of the hierarchical input data strings 116, such that the inputs to the generated neural network 118 are not the typical vectorized inputs commonly used in anti-malware neural networks but are instead based on the hierarchy of human-readable data in the strings 116. The generated neural network 116 is trained using traditional methods to generate an output that classifies input strings as malware and/or as a type of malware, a part of a family of malware, or with another such malware classification. After training, the generated neural network 118 is operable to receive a hierarchical input string of unknown type and provide a malware classification, and explanation generation module 120 is operable to provide an explanation as to why the string was classified in a certain way such as by providing a subset of the input string that is determined most responsible or statistically deterministic in the string's classification. This is achieved in part due to the configuration of the generated neural network 118, which is constructed such that the hierarchical data strings provided as input are used to architect the neural network and are provided as inputs to the neural network, and so can be evaluated as to their contribution to the neural network's output or malware classification of the input data string.

The malware classification system 102 in this example is coupled to a network, such as public network 122, enabling the malware classification system to communicate with other computers such as sandbox or other test computers 124 used to observe potential malware and to construct the hierarchical input data strings 116, and malware analyst computers 126 used by malware analysts to research new files and assign them a malware classification. In a more detailed example, a file newly identified on public network 122 but not yet classified is captured for evaluation and classification. As part of this process, certain characteristics of the executable code in the file are analyzed, and the code's behavior when executing in an isolated or sandboxed computer 124 are observed by a malware analyst 126. Characteristics of the new file are encoded in a hierarchical file such as a JSON or XML file provided to the malware classification system 102 as a hierarchical input data string, which is processed in the generated neural network 118 and explanation generation module 120 to classify the new file and provide an explanation as to what elements of the hierarchical input data string resulted in the assigned classification.

The generated neural network 118 in some examples is a hierarchical multi-instance-learning based neural network, or HMIL neural network, which is a neural network architecture configured to work with hierarchies of sets of data. In other examples, probabilistic decision trees or other such models can be used to achieve similar results. The hierarchical data provided as inputs includes in various examples sandbox behavioral characteristics such as logs generated when executing code in a file of interest in a sandbox environment, characteristics of an executable file's structure or anticipated behavior such as accessing certain hardware or certain operating system functions, and the like. This information is provided via hierarchical values as an input string to the generated neural network in key-value pairs that are sometimes called features, and which determine the classification of the file of interest.

The features or key-value pairs contributing most strongly to the classification assigned to the file of interest can be determined in one example by assigning a quality or influence score to key-feature pairs in the hierarchical input data string. This is done such as by adding features such as sequentially or in random order and observing the output of the generated neural network to determine the influence of different key-value pairs on the output, such that features having a strong influence on the malware classification generated by the neural network can be identified as an explanation for the malware classification. The explanation in further examples is reduced to rules or feature subsets that produce a more compact explanation, taking advantage of the underlying structure of the hierarchy of the data and of the generated neural network. This is desirable in many instances so that the malware analysts 126 can more easily understand the explanation.

In one such example, parent-child relationships in the hierarchy of data are considered, such as where different child features contribute to classification in a similar way and can be better characterized by including a parent feature in the explanation. Once a parent feature is selected for inclusion in the explanation, child features (and especially child features having similar contributions to classification of the input data string) no longer need to be considered individually for inclusion in the explanation generated at 120. Similarly, single samples of data that behave similarly to similar samples, such as observing similar behaviors when executing in a sandbox or other cases where a hierarchical feature is similar to other hierarchical features, can often be grouped if there is a hierarchical relationship between the features. This again provides for more compact and readable explanations.

Explanations in some examples are provided as exhaustive, including each input element found to make a statistical contribution to the output malware classification, but in other examples are reduced or minimized. In one such example, methods such as branch-and-bound are used to provide a relatively small explanation feature set having a high degree of influence on the malware classification. Modifications to branch-and-bound, such as a fast branch-and-bound algorithm or a branch-and-bound algorithm modified to evaluate or provide smaller explanations first may produce a more compact and more easily understandable output. The explanation in some further examples is limited to a certain class, such as with respect to only a specific classification of malware being evaluated, such as to determine whether a file is or is not ransomware, while in other examples will span multiple classes such as to indicate that a piece of malware has characteristics of both a botnet and a cryptominer.

The example generated neural network in the example of FIG. 1 is a hierarchical multi-instance-learning based neural network, or HMIL, which is not architected to consider order of features as a factor in determining an output. In an alternate example, the generated neural network 118 will be sensitive to the order of input features, enabling more precise classification of malware at the expense of computational efficiency. For example, a HMIL neural network may be able to identify a snippet of JavaScript code as containing certain features, but a sequence or order-sensitive neural network will additionally be able to identify the order of features in the JavaScript snippet and better recognize or predict its functionality. In other examples, a feature selection algorithm will preprocess features in other ways, such as by selecting certain features for processing while discarding others based on knowledge of the relevance of certain features to malware classification.

While methods such as these seek to improve the explanation by reducing the size, improving the readability, and ensuring a high degree of accuracy of the explanation, there are tradeoffs between providing a minimal explanation and a robust explanation. An explanation in some examples is therefore not minimized beyond a threshold of difference in degree of confidence in output or in malware classification. In other examples, thresholds for minimizing the explanation are employed, or other factors such as manual weighting of certain preferred features of interest may be used in selecting an explanation for output. In some examples, if several explanations of a similar size are available, the explanation that yields the highest confidence is chosen or is ordered first in providing an explanation to an analyst.

If the malware classification module is trained only on existing malware and its classification, assessing the quality of an explanation in making such determinations can be difficult. Methods such as observing human acceptance of the machine-based malware classification or using quantitative methods such as generating a metric for comparing a set of explanatory rules with the statistical strength of the malware classification generated by the malware classification module 114 can improve confidence in the explanation, but higher machine-learning confidence in the explanation as it is output is desirable to minimize such post-processing steps and manual intervention.

In one example, the machine learning module is further trained using one or more outputs and explanations, such that the machine learning system's confidence in the explanation is improved. In a further example, a weighting or masking function is applied when training the machine learning module using the generated explanation of the output and the output itself, and is configured to improve the output generated when the generated explanation of output is provided as input. In another example, the loss function used to train the machine learning module is optimized using an inner optimization for the estimated output and the weighting or masking function, such as using a second-order stochastic gradient descent loss function.

In another example, an input data string with a hierarchical structure is again received and analyzed using a machine learning module to generate an output, and an explanation of the output is generated comprising a subset of the input data string that is responsible for the output. The machine learning module comprises a neural network having an inner portion and an outer portion, the inner portion configured to reduce the weight of elements of the output not significantly contributing to the explanation of the output, such as by reducing the weight of as many such outputs to zero as is practical in generating the desired output. In a further example, one or more outputs of the inner layer are regularized to be either zero or the largest observed value in an inner layer output vector comprising the one or more outputs of the inner layer, penalizing the largest output value in the inner layer while zeroing output values found not to contribute to the explanation.

Both of these methods improve the confidence of the malware classification module's machine learning components in generating an explanation of an output with high confidence by training the machine learning components such as a neural network using the explanation or by forcing an inner part of the network to produce a sparse output vector having a significant number of zeros such that the output of the outer layer is generated using a small number of output elements and samples resembling the explanation will be seen often during regular training using known malware and its classification.

FIG. 2 is a flowchart of an example malware classification machine learning system using explanations of samples in the training process, consistent with an example embodiment. At 201, a hierarchical input file comprising malware and classifications is received in a machine learning system such as a neural network designed using the hierarchical schema of the training file. The input string of a sample from the hierarchical input file is processed in the neural network and a classification associated with the sample is used to construct the neural network at 204. Further, an explanation is generated through methods such as determining which elements of the input string sample contributed to the classification and using those elements as the explanation of the output.

The explanation and the output are then added to a training subset at 206, such that the neural network can be trained at 208 to recognize not only the sample and the output classification, but also the explanation and the classification. This improves the neural network's confidence in explanations generated from the training data, making explanations more reliable or definite when the trained neural network is deployed. In a further example, the explanations and outputs added to the training subset are confirmed by other methods, such as human verification or review of the output classifications associated with the explanations.

By adding the explanation of a sample into the training process, the neural network is trained for the explanations as well as for the classifications of the input samples. The training samples in one malware classification training set example may have tens of thousands of inputs as part of the input vectors, but a typical explanation of 1.4 inputs. The inputs in the explanation subset are therefore very sparse compared to the typical training sample, resulting in a network that is trained to focus specifically on those input elements that are most responsible for the output and that has high confidence in explanations generated from input samples.

In a more detailed training example, the following loss function is optimized:

$$\min_{\theta,\alpha} \sum_{i=1}^{n} [\text{loss}(\hat{y}_i, y_i) + \text{loss}(f(x_i, w_i, \theta), y_i) + \lambda_1 l_1(w_i)]$$

Where loss( ) is the loss function used to train the neural network, $\hat{y}_i$ is an estimated label, $y_i$ is a true label, $x_i$ is a sample, and f is the model and $\theta$ its parameters, $w_i$ is the explanation mask controlling the importance of items of the sample for explaining label $\hat{y}_i$, $l_1$ is the L1 norm of the mask promoting sparsity, and $\lambda_1$ is the strength of the regularization.

Further, labels $\hat{y}_i$ and weights $w_i$ in the above equation are results of an inner optimization:

$$\min_{w_i, \hat{y}_i} [\text{loss}(f(x_i, w_i, \theta), \hat{y}_i) + \alpha l_1(w_i)]$$

The inner optimization effectively creates an explanation on which the neural network is trained, which has the benefit that the neural network is optimized for explanations and is confident in the explanations. The training of the neural network is done using stochastic gradient descent but using second order gradients, as the gradient is calculated through the inner optimization.

The trained neural network can then be deployed to classify new malware as to type or family at 210, with improved confidence in the classification generated as an output due to training on explanations as well as traditional malware input vectors and classifications.

The approach of FIG. 2 improves the neural network's confidence in explanations, but the inner optimization's use of second order gradients in training the network is computationally expensive and slow. Another example of improving neural network confidence in explanations addresses this by using inner and outer networks with the inner network's outputs forced to zero or regularized to penalize the largest value output in providing output to the outer neural network.

In an alternative embodiment, in another training example similar to that as just described that excludes the $\hat{y}_i$ parameter, the loss function optimized is as follows:

$$\min_{\theta, \alpha} \sum_{i=1}^{n} [\text{loss}(f(x_i, w_i, \theta), y_i) + \lambda_1 l_1(w_i)]$$

With an inner optimization of:

$$\min_{w_i} [\text{loss}(f(x_i, w_i, \theta), y_i) + \alpha l_1(w_i)]$$

FIG. 3 is a flowchart of an example malware classification machine learning system using weighted outputs of an inner neural network layer, consistent with an example embodiment. At 301, a hierarchical input file comprising malware and classifications is received in a machine learning system such as a neural network designed using the hierarchical schema of the training file. The input string of a sample from the hierarchical input file is processed in the neural network and a classification associated with the sample is used to construct the neural network at 304. In addition to an output classification, an explanation is generated through methods such as determining which elements of the input string sample contributed to the classification and using those elements as the explanation of the output.

The neural network has inner and outer portions, and is trained at 306 using the hierarchical input file of malware and known classifications. As part of the process, weights of outputs of the inner network are changed at 308 so that the inner neural network's outputs are reduced in weight or zeroed if they do not significantly contribute to the desired output, and the other outputs are regularized to the largest output value so as to penalize the largest output value moreso than other nonzero outputs. In a further example, the neural network is configured to zero as many outputs as possible while still producing the desired output, generating a more sparse output that resembles an explanation and is focused on improving confidence in explanations generated from the network. Although the neural network described in this and other examples are described as having "inner" and "outer" layers, the "inner" layers in other examples will be hidden layers or other such elements known in the neural network field.

The trained network is deployed at 310, and is operable to classify malware characteristic input vectors as characteristic of different types or classes of malware along with an explanation of the classification comprising what portion of the input vectors are most responsible for the classification.

The examples presented herein show how the process of classifying new files as malware can be effectively automated in a way that provides a human-readable explanation for the classification with improved confidence in the explanation, reducing the burden on human analysts to review machine-based classifications for accuracy. In some example embodiments, the systems, methods, and techniques described herein are performed on one or more computerized systems. Such computerized systems are able in various examples to perform the recited functions such as collecting file data, deriving a hierarchical input string from the file data, analyzing generating a neural network corresponding to the input data hierarchy, providing an explanation of the input factors that cause an input string to be classified in a certain way, and other such tasks by executing software instructions on a processor, and through use of associated hardware.

Figure 4:
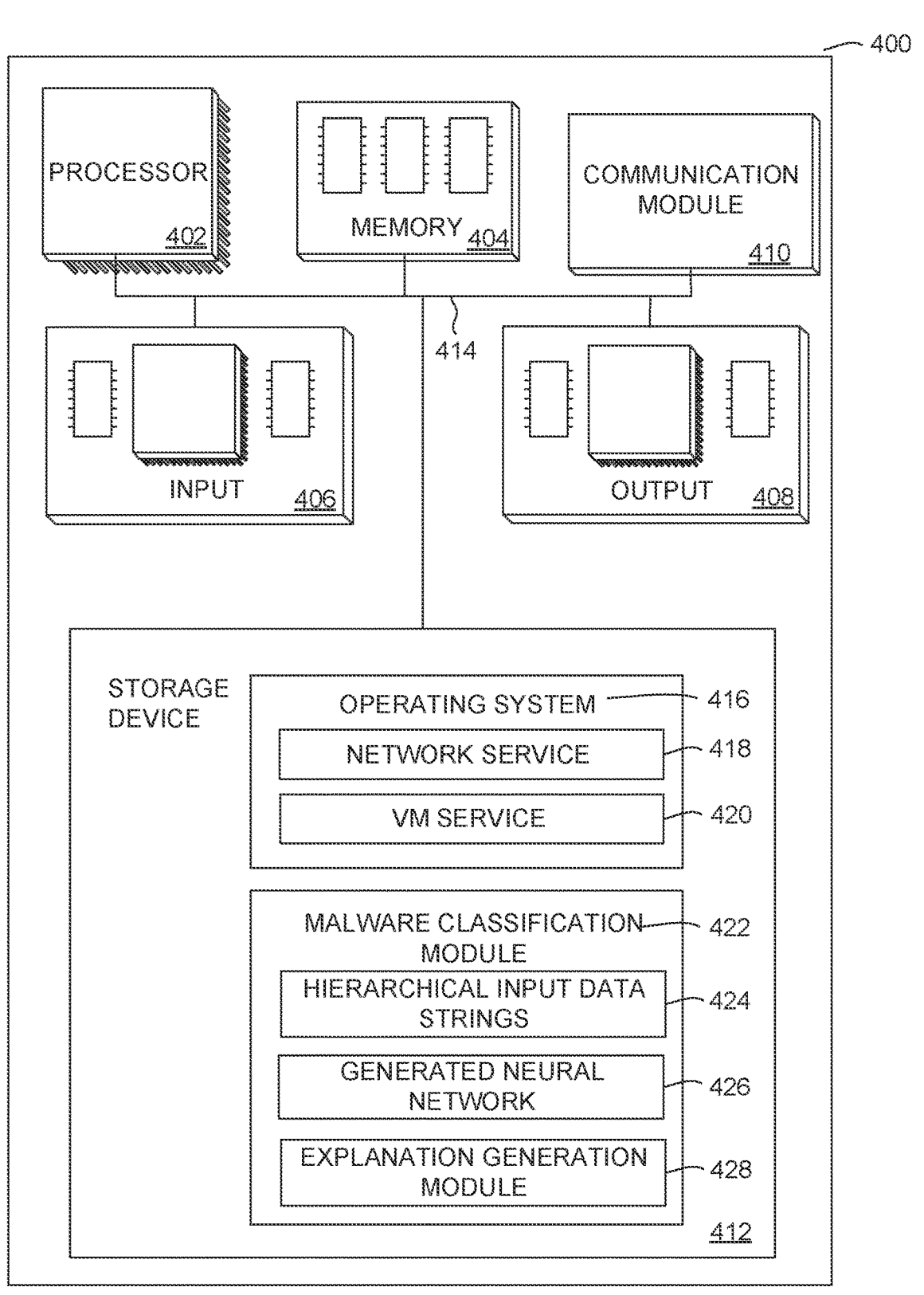
FIG. 4 is a computerized malware characterization system, consistent with an example embodiment of the present invention.

FIG. 4 is one example of such a computerized malware classification system. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server or virtualized honeypot device. One or more applications, such as malware classification module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as malware classification module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as malware classification module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to wirelessly communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as malware classification module 422 to components of computing device 400. For example, operating system 416, in one example, facilitates the communication of various applications such as malware classification module 422 with processors 402, communication unit 410, storage device 412, input device 406, and output device 408. Applications such as malware classification module 422 may include program instructions and/or data that are executable by computing device 400. As one example, malware classification module 422 uses one or more hierarchical input strings representing a file, device, or other subject for classification at 424 to generate a neural network 426 having a structure dependent on the hierarchy of the input data strings. An explanation generation module 428 provides a human-readable explanation for the classification, reducing the burden on human analysts to review machine-based classifications for accuracy and reliability. The generated neural network 426 is architected and/or trained to provide improved confidence in the explanations generated by explanation generation module 428, which in some examples comprise one or more features of the malware's hierarchical input data string provided to the generated neural network 426 that are most responsible for the malware's classification. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of generating an explanation of output from a machine-learning system, comprising:

receiving an input data string having a hierarchical structure;

analyzing the input data string using a machine learning module to automatically generate an output corresponding to the received input data string;

generating an explanation of the output comprising a subset of the input data string that is responsible for the output; and training the machine learning module using a loss function optimized with an inner optimization that generates a sparse output corresponding to the explanation of the output, wherein the explanation comprises a subset of the input data string selected according to hierarchical groupings within the input data string, and wherein the training uses the explanation as a training input to update the machine learning module based on the hierarchical structure.

2. The method of generating an explanation of output from a machine-learning system of claim 1, further comprising applying a weighting or masking function when training the machine learning module using the generated explanation of the output and the output, configured to improve the output generated when the generated explanation of output is provided as input.

3. The method of generating an explanation of output from a machine-learning system of claim 2, wherein the loss function used to train the machine learning module is optimized using an inner optimization for an estimated output and the weighting or masking function.

4. The method of generating an explanation of output from a machine-learning system of claim 3, wherein the loss function optimization is trained using second-order stochastic gradient descent.

5. The method of generating an explanation of output from a machine-learning system of claim 1, further comprising constructing the machine learning module using a hierarchy of the input data string.

6. The method of generating an explanation of output from a machine-learning system of claim 1, wherein the machine learning module is a neural network.

7. The method of generating an explanation of output from a machine-learning system of claim 6, wherein the neural network comprises a hierarchical multiple-instance-learning neural network.

8. The method of generating an explanation of output from a machine-learning system of claim 7, wherein the neural network comprises an outer optimization of a loss function, and an inner optimization for one or more parameters of the loss function.

9. The method of generating an explanation of output from a machine-learning system of claim 6, wherein generating an explanation of the output is performed using logic other than the neural network.

10. A method of generating an explanation of output from a machine-learning system, comprising:

receiving an input data string having a hierarchical structure;

analyzing the input data string using a machine learning module to automatically generate an output corresponding to the received input data string; and generating an explanation of the output comprising a subset of the input data string that is responsible for the output;

the machine learning module comprising a neural network having an inner portion and an outer portion, wherein the inner portion is configured to reduce or zero the weight of elements of the output while still producing a desired output and wherein the outer portion aggregates a sparse output vector to produce a classification output, wherein the inner portion generates instance-level outputs that correspond to hierarchical segments of the input data string and are reduced or zeroed based on the hierarchical groupings, and wherein the outer portion aggregates the instance-level outputs according to the hierarchical structure.

11. The method of generating an explanation of output from a machine-learning system, of claim 10, wherein reducing or zeroing the weight of elements of the output while still producing a desired output comprises reducing the weight to zero.

12. The method of generating an explanation of output from a machine-learning system, of claim 11, wherein reducing or zeroing the weight of elements of the output while still producing a desired output to zero comprises reducing the weights of as many elements of the output to zero as can be achieved while still generating the desired output.

13. The method of generating an explanation of output from a machine-learning system, of claim 10, further comprising regularizing one or more outputs of the inner layer to be either zero or the largest observed value in an inner layer output vector comprising the one or more outputs of the inner layer.

14. The method of generating an explanation of output from a machine-learning system of claim 10, further comprising constructing the machine learning module using a hierarchy of the input data string.

15. The method of generating an explanation of output from a machine-learning system of claim 10, wherein the machine learning module is a neural network.

16. The method of generating an explanation of output from a machine-learning system of claim 15, wherein the neural network comprises a hierarchical multiple-instance-learning neural network.

17. The method of generating an explanation of output from a machine-learning system of claim 15, wherein the inner portion outputs instances of the input and the outer portion outputs aggregated output of the inner portion.

18. The method of generating an explanation of output from a machine-learning system of claim 10, wherein the inner portion and the outer portion of the machine learning module are configured to improve the confidence of the machine learning module in the explanation.

19. The method of generating an explanation of output from a machine-learning system of claim 10, wherein the inner portion and outer portion of the machine learning module are configured to reduce the size of explanation of output.

20. A machine learning system, comprising:

a processor and a memory; and a machine-readable medium with instructions stored thereon, the instructions when executed on the processor operable to cause the processor to:

receive an input data string having a hierarchical structure;

analyze the input data string using a machine learning module to automatically generate an output corresponding to the received input data string;

generate an explanation of the output comprising a subset of the input data string that is responsible for the output; and train the machine learning module using the generated explanation of the output and the output, wherein the explanation is used as a training input and wherein the machine learning module comprises a neural network with an inner portion producing a sparse output corresponding to an explanation of the output and an outer portion aggregating the sparse output to produce the classification, wherein the inner portion produces a sparse output corresponding to an explanation that comprises a subset of the input data string selected according to hierarchical groupings within the input data string, and wherein the explanation is provided as a training input to update the neural network using the hierarchical structure of the input data string.

* * * * *